United States Patent
Kellum et al.

(10) Patent No.: US 8,617,030 B2
(45) Date of Patent: Dec. 31, 2013

(54) VEHICLE SPEED CONTROL SYSTEM

(75) Inventors: Carroll C. Kellum, Cedar Falls, IA (US); Hadeel Taha, Ludwigshafen (DE)

(73) Assignee: Deere & Company, Moline, IL (US)

( * ) Notice: Subject to any disclaimer, the term of this patent is extended or adjusted under 35 U.S.C. 154(b) by 258 days.

(21) Appl. No.: 13/276,573

(22) Filed: Oct. 19, 2011

(65) Prior Publication Data

US 2013/0102438 A1 Apr. 25, 2013

(51) Int. Cl.
  *B60W 10/04* (2006.01)
  *F16H 59/00* (2006.01)
  *G06F 7/00* (2006.01)
  *B60T 8/32* (2006.01)

(52) U.S. Cl.
  USPC .......... 477/110; 477/98; 701/60; 701/93

(58) Field of Classification Search
  USPC ......... 477/98, 110, 111; 701/55, 56, 60, 93; 180/170
  See application file for complete search history.

(56) References Cited

U.S. PATENT DOCUMENTS

| | | | | |
|---|---|---|---|---|
| 5,053,963 A | * | 10/1991 | Mack | 701/53 |
| 5,685,801 A | * | 11/1997 | Benford et al. | 477/108 |
| 7,686,736 B2 | * | 3/2010 | Stamm et al. | 477/108 |
| 8,321,099 B2 | * | 11/2012 | Yamada et al. | 701/51 |
| 2009/0048746 A1 | * | 2/2009 | Kaigawa | 701/54 |
| 2009/0227417 A1 | * | 9/2009 | Imamura et al. | 477/5 |
| 2009/0256354 A1 | * | 10/2009 | Ullrich et al. | 285/308 |
| 2011/0166754 A1 | * | 7/2011 | Kolk et al. | 701/54 |

\* cited by examiner

*Primary Examiner* — Roger Pang

(57) ABSTRACT

A method of controlling an engine and a transmission coupled to the engine. The method including the steps of receiving and proceeding. The receiving step receives a signal value from a sensor. The signal value is representative of a desired ground engaging device speed of a vehicle. The proceeding step proceeds along a shift path defined by a one-to-one correspondence between the signal value and the ground engaging device speed. The proceeding step includes the steps of controlling a speed of the engine and selecting of a gear of the transmission along the shift path dependent upon the signal value.

20 Claims, 4 Drawing Sheets

VEHICLE SPEED CONTROL SYSTEM

FIELD OF THE INVENTION

The present invention relates to a vehicle, and, more particularly, to a speed control method and apparatus for controlling the speed of a vehicle.

BACKGROUND OF THE INVENTION

An automatic gearbox is a type of a vehicle transmission that automatically changes gear ratios during operation of the vehicle. Automatic transmissions have a defined set of gear ranges that are utilized in the shifting in both the upshifting and downshifting of the automatic transmission. Additionally, there are semi-automatic transmissions that allow a driver to have the option of shifting the transmission or the transmission will shift itself. Additionally, there are continuously variable transmissions (CVTs) that offer a wide range of ratios as the vehicle travels. The CVT is utilized to provide essentially an infinite number of gear ratios between a low and a high ratio. A CVT transmission, such as the one in some models of Subaru vehicles allows for the shifting by use of shift paddles associated with the steering wheel, thereby allowing the operator to shift manually from one gear to another.

Most vehicles sold in North America since the 1950s have been available with an automatic transmission. The concept is that a vehicle equipped with an automatic transmission is less complex to drive freeing the operator from the manual shifting and interaction with the clutch and the transmission shifter thereby allowing the operator to keep both hands on the steering wheel. The automatic transmission may have several operating modes that are selected by the driver, typically while the vehicle is at a standstill.

Automatic transmissions typically have several manually initiated control features, including a throttle kick-down. The throttle kick-down allows for a forced downshift in order to allow the vehicle to be mainly controlled by the engine speed in selected situations where additional acceleration is needed, such as when the operator decides to pass another vehicle. The driver can also choose between different preset shifting programs, for example, an economy mode or a performance mode. The selection of a preset shifting mode allows for either higher economy in the economy mode or delayed shifting for maximum acceleration during the performance mode. Some transmissions have a mode in which the driver has full control of the ratio changes by way of a manual selection of the ratio by way of a button or a paddle thereby overriding many of the automated features of the automatic transmission. The usefulness of such a control schema is demonstrated in such situations as in a vehicle cornering situation when a shifting of gears during the cornering operation could result in a compromise of the vehicle's balance. In the 1990s Porsche introduced a shifter that allows for the manual shifting of an otherwise automatic transmission. Additionally, some automatic transmissions, include a winter mode, such as Mercedes having a summer and winter mode that allows for the transmission to start in a gear other than first gear. When the winter selection is made the transmission will start in the second gear, rather than the first gear, to thereby reduce the tendency to lose traction.

Inputs sensors are utilized in a transmission control unit including sensors that indicate the current speed of the vehicle, a wheel speed sensor, as well as a throttle position sensor. The throttle position sensors are often utilized to determine the optimal time for selecting a gear change based on the load the engine is encountering. Additionally, the throttle position sensor can be utilized by the transmission control unit along with the vehicle speed sensor to determine the desired acceleration of the vehicle, and compare this with a nominal value, to see if the actual value is a higher or lower to thereby detect a higher load to thereby alter the characteristics of the transmission gear shift pattern. Throttle position control by the vehicle operator is the emphasis of vehicle speed control as is clear to anyone who drives a vehicle.

The problem with the speed control systems of the prior art are that the operator is utilized to provide a throttle input so that the speed of the vehicle is then regulated by the operator's continuous adjustment of the throttle input. In some instances this causes the operator to have to vary the throttle position in order to cause the transmission to shift and the operator is part of the control loop to ensure that the vehicle speed is being regulated by the throttle position maintained by the operator.

What is needed in the art is a method and apparatus to effectively control a vehicle speed based upon an operator selected speed.

SUMMARY

The invention in one form is directed to a vehicle including a base unit, an engine, a transmission, at least one ground engaging propulsion device, an operator input device, and a controller. The engine is carried by the base unit. The transmission has an input shaft coupled to the engine. The engine providing rotational power to the transmission at a rotational speed. The transmission having an output shaft with a plurality of gear selections between the input shaft and the output shaft. The ground engaging propulsion device is driven by the transmission. The operator input device produces a signal value representative of a desired speed of the at least one ground engaging propulsion device. The controller is configured to control the engine and the transmission including receiving the signal value; and proceeding along a shift path defined by a one-to-one correspondence between the signal value and a ground engaging device speed value. The controller is further configured to control the engine speed and the selecting of a gear of the transmission along the shift path dependent upon the signal value.

The invention in another form is directed to a method of controlling an engine and a transmission coupled to the engine. The method including the steps of receiving and proceeding. The receiving step receives a signal value from a sensor. The signal value is representative of a desired ground engaging device speed of a vehicle. The proceeding step proceeds along a shift path defined by a one-to-one correspondence between the signal value and the ground engaging device speed. The proceeding step includes the steps of controlling a speed of the engine and selecting of a gear of the transmission along the shift path dependent upon the signal value.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate one embodiment of the invention and such exemplifications are not to be construed as limiting the scope of the invention in any manner.

DETAILED DESCRIPTION

Figure 1:
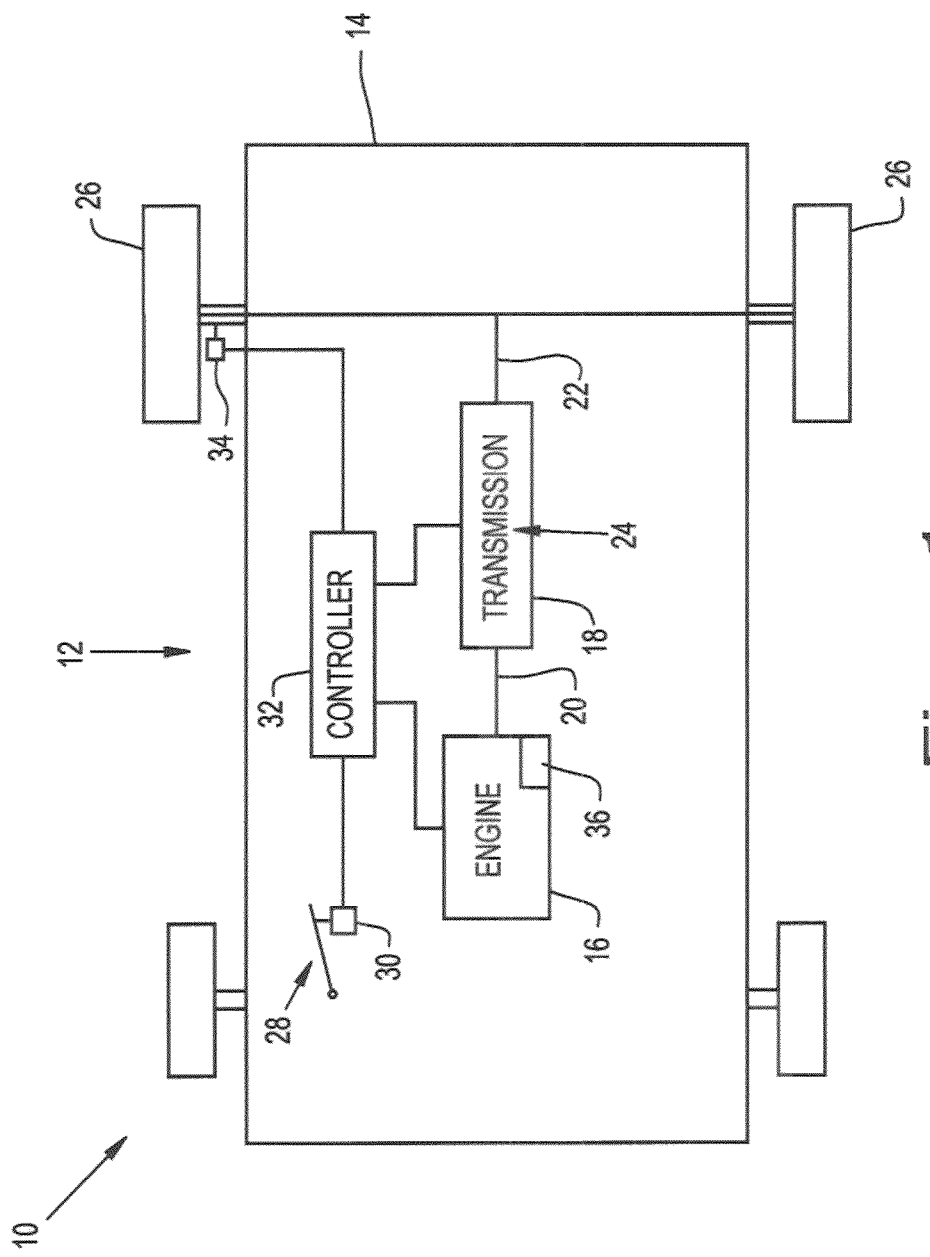
FIG. 1 is a schematical top view of a vehicle system utilizing an embodiment of a wheel speed control system of the present invention.

Referring now to the drawings, and more particularly to FIG. 1, there is illustrated an embodiment of a speed control system 10 including a vehicle 12, a base unit 14, an engine 16, and a transmission 18. Transmission 18 includes an input shaft 20 and an output shaft 22. Transmission 18 includes a plurality of discrete ratio selections also known as gears 24 to thereby regulate the speed of output shaft 22 relative to input shaft 20. Vehicle 12 additionally includes ground engaging propulsion devices 26, an input device 28, a sensor 30 associated with input device 28, a controller 32 and a wheel speed sensor 34. Although gears 24 are referred to herein, this is for the sake of convenience and equally applies to transmissions that use elements other than gears to provide a plurality of different input/output ratios between input shaft 20 and output shaft 22.

Engine 16 and transmission 18 are carried by base unit 14, while engine 16 and transmission 18 are interconnected, perhaps with a clutch (not illustrated) coupled therebetween. For the sake of simplicity and ease of understanding the present invention, engine 16 is illustrated as being directly connected to transmission 18, by way of input shaft 20. Additionally, transmission 18 is illustrated as being connected to ground engaging propulsion devices 26 directly, although it is understood that a differential or other apparatus is often utilized to provide this transfer of power from transmission 18 to ground engaging propulsion devices 26. Ground engaging propulsion devices 26 are also known as wheels, although other ground engaging propulsion devices, such as tracks, are also contemplated to be utilized with the present invention. Vehicle 12 can, without limitation, be an agricultural vehicle, a construction vehicle, a forestry vehicle, an industrial vehicle or the like.

Controller 32 is illustrated as a separate unit. Although it is understood that controller 32 may be part of an engine control unit associated with engine 16 and/or a transmission control unit associated with transmission 18. Controller 32 may be a digital electronic device or another type of controller suited for carrying out the elements of the present invention.

Input device 28 may be in the form of a foot pedal that is controlled by the operator. The foot pedal may be pressed or released, and the position of input device 28 is detected by sensor 30 and the signal value produced by sensor 30 is conveyed to controller 32 by the communicative coupling therebetween. A wheel speed sensor 34 is associated with one or more of the wheels to determine the current speed of the wheels. Controller 32 receives a signal from wheel speed sensor 34, providing information utilized by the present invention to control the speed of engine 16 and the selection of a gear 24 of transmission 18. The position of input device 28 is directly related to a desired wheel speed of ground engaging propulsion devices 26 and is not related to a desired throttle position of engine 16. Controller 32 receives the signal value from sensor 30 as well as information from wheel speed sensor 34 to determine what commands to send to engine 16 and transmission 18 to coordinate the power being delivered to ground engaging propulsion devices 26 to thereby achieve the wheel speed desired by the positioning of input device 28.

Figure 2:
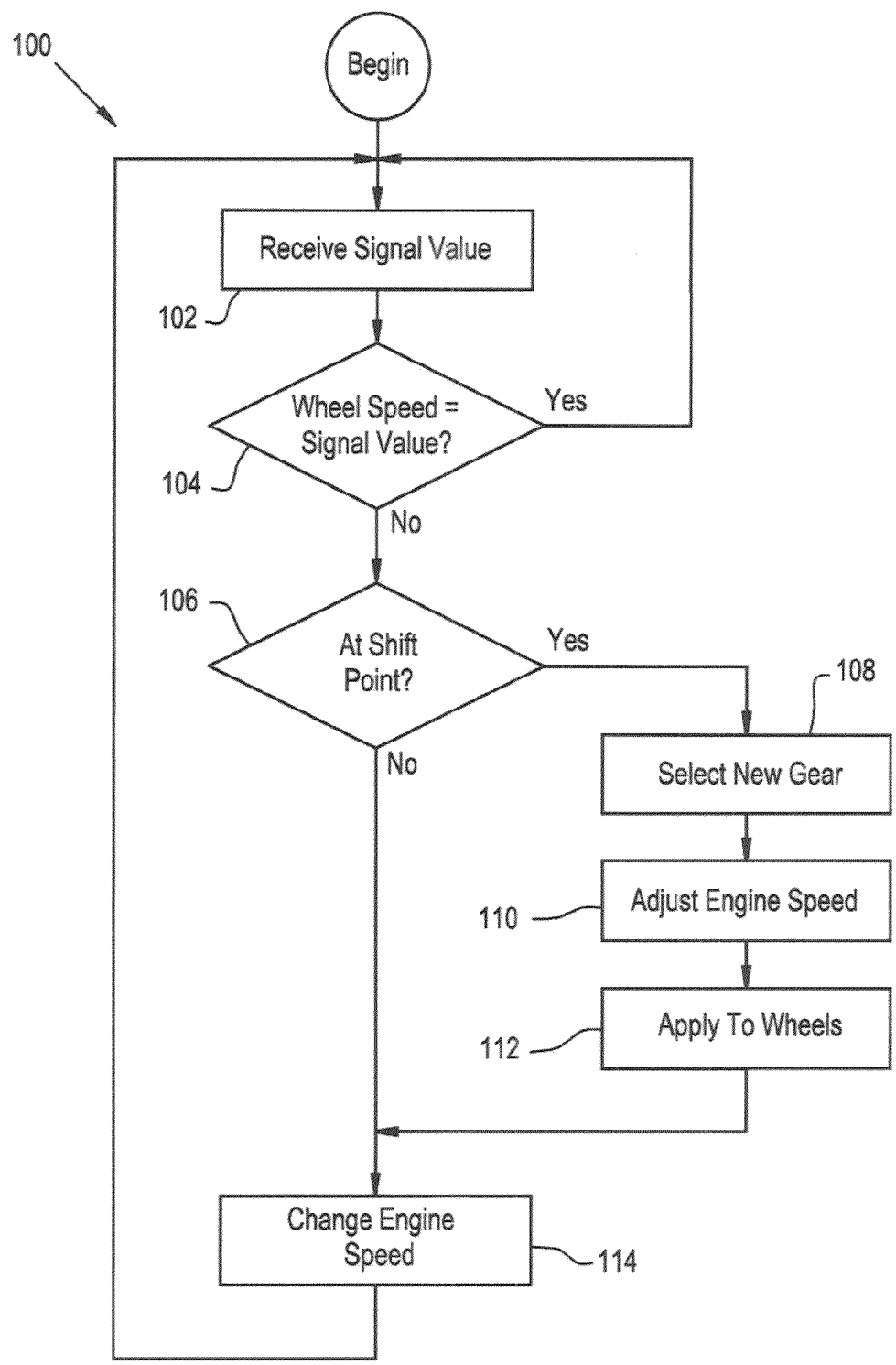
FIG. 2 is a block diagram of one embodiment of the wheel speed control system of FIG. 1.
Figure 3:
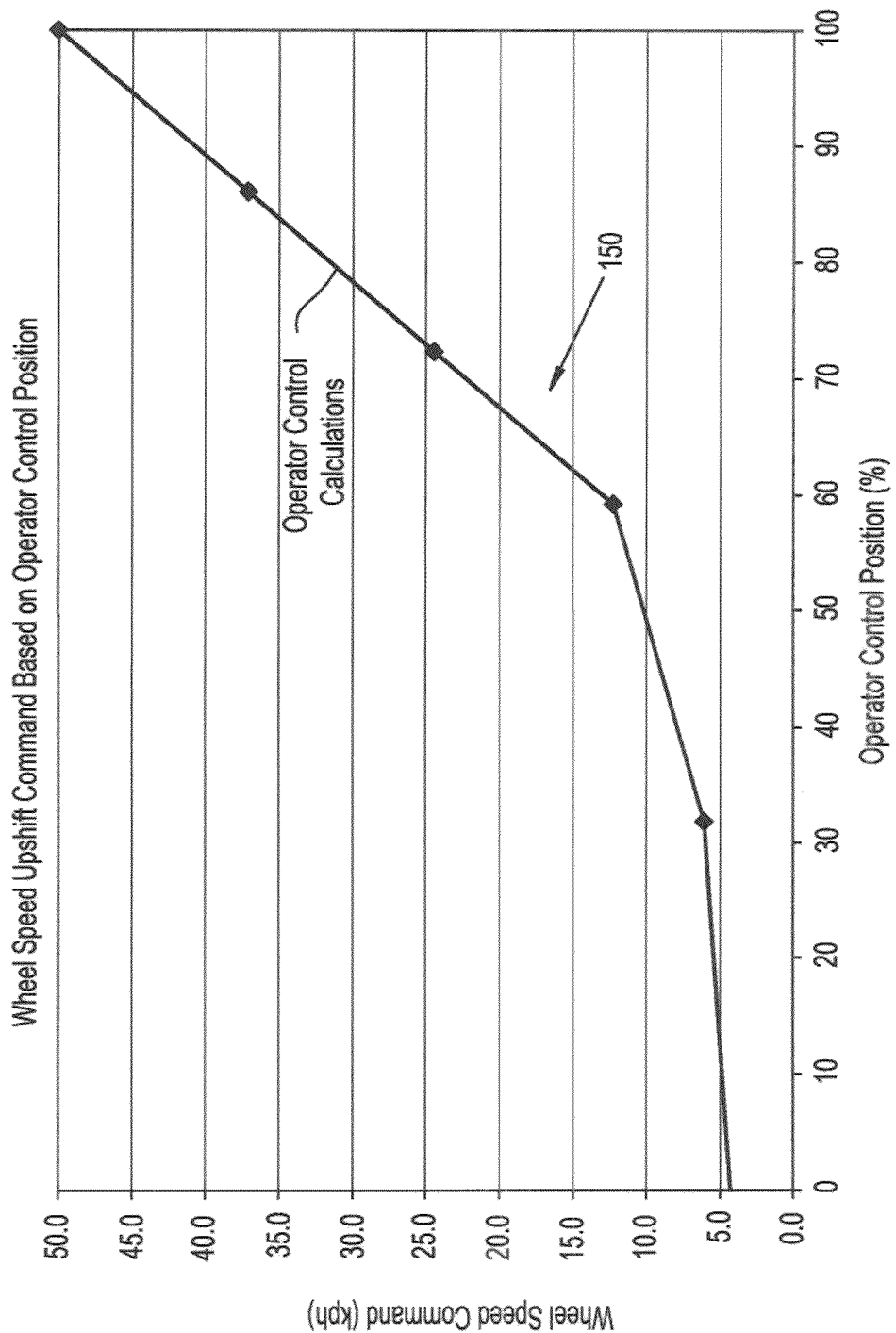
FIG. 3 is a chart of a wheel speed upshift command based on the operator control position of the wheel speed control system of FIGS. 1 and 2.
Figure 4:
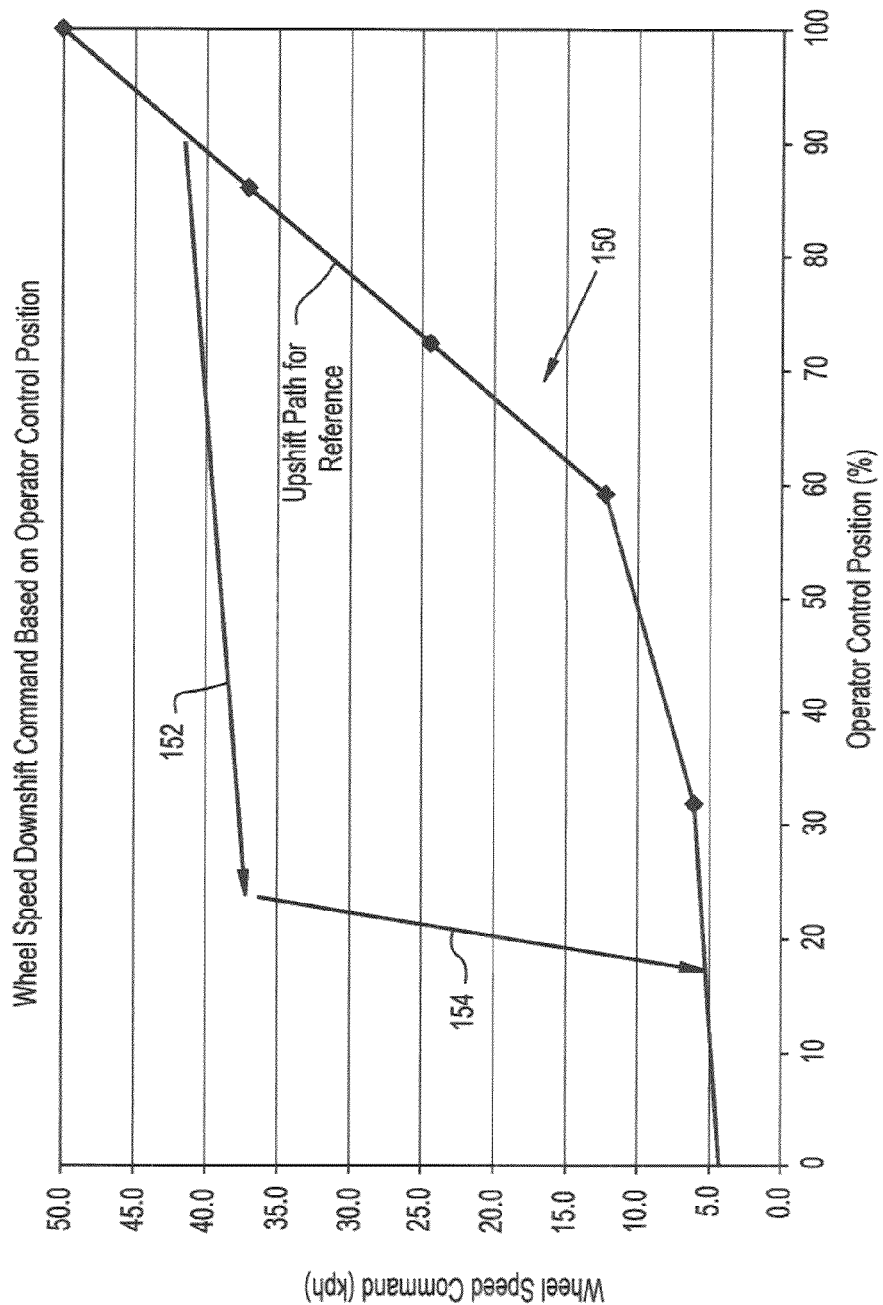
FIG. 4 is a chart used to illustrate a downshift aspect of the wheel speed control system of FIGS. 1 and 2.

Now, additionally referring to FIGS. 2-4, there is illustrated an embodiment of a method 100 carried out by commands sent from controller 32 in response to inputs received by controller 32. FIG. 2 illustrates a method 100 which is a method of controlling engine 16 and transmission 18. At step 102, controller 32 receives the signal value from sensor 30 representative of the desired wheel speed. As can be seen in FIG. 3, there is a one-to-one correspondence between the received signal value illustrated in FIG. 3 as the operator control (input device 28) position is related to the desired wheel speed. The operator control position is given in terms of a percent, which is analogous to the positioning of input device 28 from its released position (0%) to a fully depressed position (100%). Controller 32 then determines if the wheel speed received from wheel speed sensor 34 is comparable to the signal value from sensor 30 at step 104. If the wheel speed is properly associated with the signal value, then method 100 returns to step 102. If the wheel speed is not equivalent to the signal value as associated with the curve illustrated in FIG. 3, then, method 100 proceeds to step 106. At step 106, controller 32 determines if it is time to shift transmission 18 from one gear 24 to another subsequent gear 24 by asking the question as to whether a shift point has been reached. If at step 106 it is determined that no shifting is necessary, then, method 100 proceeds to step 114, where the difference between the desired wheel speed, represented by the signal value from input sensor 30 and the actual wheel speed, which is represented by a signal from wheel speed sensor 34, is dealt with by changing the speed of engine 16.

If at step 106 it is determined that it is time to shift transmission 18, then method 100 proceeds to step 108, where a new ratio is selected for transmission 18 by selecting another gear 24. The engine speed is adjusted at step 110, in coordination with the new gear selection of transmission 18. It should also be understood that a clutching control, not illustrated, may be undertaken while transmission 18 is shifted which also allows the speed of engine 16 to be appropriately adjusted before re-engaging the power from the engine 16 to transmission 18. Also, it is to be understood that steps 108 and 110 maybe carried out substantially at the same time. Once the gear selection of transmission 18 has been engaged and the speed of engine 16 have been adjusted, which is adjusted to conform to curve 150 of FIG. 3, then the power from engine 16 is again applied to the wheels by way of transmission 18 at step 112. The present invention adjusts the engine speed as well as the gear selection to thereby preclude perceptible jerks in the shifting sequence.

Now, in the form of an illustration, an upshift procedure will be discussed relative to speed control system 10 of the present invention. As input device 28 is depressed by the operator's foot, sensor 30 receives the increased position information and sends a new signal value to controller 32. This can be understood by looking at FIG. 3, where, for example, if the operator has depressed the foot pedal from a position of 20% to a position of 60% then this is conveying information to controller 32 to increase the speed of ground engaging propulsion devices 36 from approximately 5 km/h to approximately 12 km/h. This increase then is undertaken by executing method 100 where the wheel speed and signal values are detected and compared at step 104 and then if the shifting of transmission 18 is needed, the subsequent ratio gear 24 is generally selected allowing the engine speed at step 110 to be decreased and then once the power is applied at step 112, the engine speed is increased by changing the engine speed at step 114 to achieve the desired wheel speed. The increase of the engine speed is undertaken after it had been lowered at step 110 to thereby continue the increase of power being delivered to ground engaging propulsion devices 26 commensurate with the new gear selection, so that the control of system 10 is undertaken along an upshift path that conforms to curve 150.

Although the discrete points on curve 150 illustrate a curvilinear representation, a smoother curved one-to-one correspondence between the position of input device 28 and the desired wheel speed can be utilized. Additionally, even though there are points on the graph they should not be thought of as shift points and the reference to such a curve as a shift curve is for the ease of explanation. It is understood that the actual upshift and downshift paths relate to the transition of gear selections and engine speeds in upshift (increasing wheel speed) operations and in downshift (deceasing wheel speed) operations.

The present invention dynamically controls where the shift points occur based upon the operator position of input device 28, as a rate of change of operator change of input device 28, as well as other input considerations as it controls speed control system 10 along curve 150. Transmission 18 may have more than 10 and even more than 20 selections of gears 24, such that each subsequent ratio can be selected in an optimized fashion as speed control system 10 upshifts along curve 150 to thereby control the speed of ground engaging propulsion devices 26.

Now, looking at method 100 relative to a downshift operation, when the signal value from sensors 30 indicates a reduction in desired wheel speed, controller 32 receives the signal and detects the difference at step 104. On the downshift path the concept is illustrated in FIG. 4, where controller 32 holds and doesn't shift from the current selected gear 24 as is schematically represented by line 152 (although the control position relative to the desired wheel speed is being adhered to in either the upshift and downshift aspect of the invention) that indicates that engine speed is reduced while the gear ratio is maintained. Then when a downshift is triggered as represented by a line 154 several gear selections in the sequence of gears may be/skipped over to continue to match a selected gear 24 with the speed of engine 16 that seeks then to match the speed of ground engaging device 26 to the signal value from input sensor 30. This allows for intentional hysteresis within the system to preclude any unnecessary upshifting and downshifting during the operation of speed control system 10. One way of considering the downshift path is that if there are considered to be N sequential ratios of gears 24 within the upshift path that leads to a sequential shifting from the initial gear to the Nth gear, then the downshift path includes skipping from the Nth gear to the (N−M)th gear, where M is at least 2, thereby describing a downshift that skips at least one intervening gear 24.

The present invention divides the speed of ground engaging propulsion device 26 into two primary functions—the upshift path and the downshift path. The paths result from an adherence to curve 150, which defines the desired output wheel speed of speed control system 10 as conveyed by the operator's selected positioning of input device 28. During the first X % of the pedal travel of input device 28 the wheel speed control is designed so that no upshift takes place and transmission 18 stays in the low idle gear. Any wheel speed increase is then due to an increase in engine speed. The X value changes as the state of the system changes and as the operator changes the position of input device 28. As the foot pedal travels beyond X % to 100% the wheel speed demand is increased by controller 32 such that the remaining gear upshifts take place, leading to the top wheel speed at the top engine speed illustrated in curve 150 of FIG. 3.

The downshift path is designed so that as the operator reduces the foot pedal position, it causes a lower signal value from input sensor 30, and the current gear is held until the speed of engine 16 drops below a predetermined engine speed dependent upon the wheel speed, which can be thought of as a downshift point. The upshift points and downshift points are designed in order to avoid an upshift followed by a downshift or vice versa, with the downshift points for each gear transition being at a lower wheel speed than the upshift transitions. These values are dynamically adjusted as needed. For example, a dynamic adjustment of the engine operating points can change during operation. For example, one reason to change the operating points is the need of an elevated low idle of engine 16. The low idle can be increased in order to burn off exhaust particulates captured in a particulate filter 36. The exhaust particulates are collected in particulate filter 36 as a result of an environmental criteria and by dynamically altering the shift points in association with curve 150 then the increased idle speed will causes a higher temperature exhaust that is used to burn the exhaust particulates captured in particulate filter 36. For example, the engine speed may be held to at least 1200 RPM to accommodate the particulate burn off thereby altering where the shift points may occur in order to preserve the one-to-one correspondence between the operator control position and the wheel speed command represented by the signal value from sensor 30 and curve 150. Advantageously, the present invention controls the interaction between engine 16 and transmission 18 to preclude noticeable gearshift transitions the operator might otherwise encounter. Additionally, the present invention allows for an input from the operator to control wheel speed allowing speed control system 10 to interpret the desired wheel speed by way of selecting engine speed and transmission gear selections. In the prior art, system downshifts are commanded as a consequence of engine speed which is not directly dependent upon the wheel speed. Additionally, the present invention divorces the throttle control from the pedal position and uses the pedal to establish the desired wheel speed, which is what the operator desires to control. This advantageously eliminates adjustments by the operator of the engine speed in an attempt to arrive at the desired ground speed.

The transitions from one gear to the subsequent higher gear on the upshift path takes place at the upshift points, which may, for the sake of illustration, be arbitrarily selected to be from a $7^{th}$ gear to an $8^{th}$ gear. The necessity of the transition being driven by the signal value from sensor 30 that indicates a higher desired wheel speed, at step 106 of method 100. The transition takes place at a defined engine speed (which can be dynamically changed). However, along the downshift path the downshift transition from the $8^{th}$ gear to a lower gear, which for the sake of discussion is selected to be $3^{rd}$ gear, occurs at a lower engine speed than the upshift point that is established for the upshift from $7^{th}$ gear to the $8^{th}$ gear. Then at that downshift transition, which is dynamically determined and could be to another gear, the speed of engine 16 is adjusted to correspond to the $3^{rd}$ gear selection and the desired wheel speed is arrived at according to curve 150 by further shift transitions and engine speeds selections as needed.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A vehicle, comprising:
    a base unit;
    an engine carried by said base unit;
    a transmission having an input shaft coupled to said engine, said engine providing rotational power to said transmission at a rotational speed, said transmission having an output shaft, said transmission having a plurality of gear selections defining a corresponding plurality of ratios between said input shaft and said output shaft;
    at least one ground engaging propulsion device driven by said transmission;
    an operator input device producing a signal value representative of a desired speed of said at least one ground engaging propulsion device; and
    a controller for controlling the engine and the transmission, said controller being configured to receive said signal value and to proceed along a shift path defined by a one-to-one correspondence between said signal value and a ground engaging device speed value, said controller being further configured to control the engine speed and the gear selection of the transmission along said shift path dependent upon said signal value.

2. The vehicle of claim 1, wherein said signal value does not represent said rotational speed.

3. The vehicle of claim 1, wherein said shift path includes a plurality of upshift points and downshift points, each of said plurality of upshift points being associated with a transition from one of said gears to a subsequent higher gear.

4. The vehicle of claim 3, wherein each of said downshift points are associated with a transition from a higher gear to a lower gear, said downshift points being lower relative to said ground engaging device speed than said upshift points associated with said downshift points.

5. The vehicle of claim 4, wherein as said signal value indicates an increased desired speed of said ground engaging device said speed of the engine is increased by said controller until said upshift point is reached, then if said signal value indicates a further increased desired speed of said ground engaging device then said controller commands that said transition to said subsequent higher gear take place and said speed of the engine is altered such that a combination of said subsequent higher gear and said speed of the engine continues along said shift path.

6. The vehicle of claim 4, wherein as said signal value indicates a decreased desired speed of said ground engaging device said speed of the engine is decreased until said downshift point is reached, then if said signal value indicates a further decreased desired speed of said ground engaging device said controller commands that a lower gear be selected and said speed of the engine is altered such that a combination of said lower gear and said speed of the engine continues along said shift path.

7. The vehicle of claim 4, wherein said plurality of gears include a series of gears including an initial gear through an Nth gear, as said signal is increased said ground engaging device speed is increased by said proceeding step by sequentially proceeding from said initial gear to said Nth gear, said transition associated with said downshift point includes skipping from said Nth gear down to an (N−M)th gear, where M is at least 2.

8. The vehicle of claim 4, wherein said controller is further configured to dynamically adjust said upshift points and said downshift points.

9. The vehicle of claim 8, wherein said dynamically adjust includes repositioning at least one of said upshift points and said downshift points dependent upon an input.

10. The vehicle of claim 9, wherein said input is an environmentally driven criteria.

11. A method of controlling an engine and a transmission having a plurality of gears, the transmission being coupled to the engine, the method comprising the steps of:
    receiving a signal value from a sensor, said signal value being representative of a desired ground engaging device speed of a vehicle; and
    proceeding along a shift path defined by a one-to-one correspondence between said signal value and said ground engaging device speed, said proceeding step including the steps of controlling a speed of the engine and selecting one of said plurality of gears in the transmission along said shift path dependent upon said signal value.

12. The method of claim 11, wherein said shift path includes a plurality of upshift points and downshift points, each of said plurality of upshift points being associated with a transition from one of said gears to a subsequent higher gear.

13. The method of claim 12, wherein each of said downshift points are associated with a transition from a higher gear to a lower gear, said downshift points being lower relative to said ground engaging device speed than each corresponding said upshift points.

14. The method of claim 13, wherein as said signal value indicates an increased desired speed of said ground engaging device said speed of the engine is increased until said upshift point is reached, then if said signal value indicates a further increased desired speed of said ground engaging device said transition to said subsequent higher gear takes place and said speed of the engine is altered such that a combination of said subsequent higher gear and said speed of the engine continues along said shift path.

15. The method of claim 13, wherein as said signal value indicates a decreased desired speed of said ground engaging device said speed of the engine is decreased until said downshift point is reached, then if said signal value indicates a further decreased desired speed of said ground engaging device a lower gear is selected and said speed of the engine is altered such that a combination of said lower gear and said speed of the engine continues along said shift path.

16. The method of claim 13, wherein said plurality of gears include a series of gears including an initial gear through an Nth gear, as said signal is increased said ground engaging device speed is increased by said proceeding step by sequentially proceeding from said initial gear to said Nth gear, said transition associated with said downshift point includes skipping from said Nth gear down to an (N−M)th gear, where M is at least 2.

17. The method of claim 13, further comprising the step of dynamically adjusting said upshift points and downshift points.

18. The method of claim 17, wherein said step of dynamically adjusting includes repositioning at least one of said upshift points and said downshift points dependent upon an input.

19. The method of claim 18, wherein said input is an environmentally driven criteria.

20. The method of claim 19, wherein said environmentally driven criteria includes a command to increase the speed of the engine to burn off exhaust particulates captured in a filter.

* * * * *